US007814073B2

(12) United States Patent
Phenix

(10) Patent No.: US 7,814,073 B2
(45) Date of Patent: Oct. 12, 2010

(54) UTILITY FOR IDENTIFYING DIFFERENCES BETWEEN TWO JAVA OBJECTS

(75) Inventor: John Phenix, Broadstone (GB)

(73) Assignee: JP Morgan Chase Bank, New York, NY (US)

(*) Notice: Subject to any disclaimer, the term of this patent is extended or adjusted under 35 U.S.C. 154(b) by 1950 days.

(21) Appl. No.: 10/667,816

(22) Filed: Sep. 22, 2003

(65) Prior Publication Data
US 2004/0221264 A1 Nov. 4, 2004

Related U.S. Application Data

(60) Provisional application No. 60/467,340, filed on May 5, 2003.

(51) Int. Cl.
*G06F 17/30* (2006.01)

(52) U.S. Cl. .................................... 707/690
(58) Field of Classification Search .................. 707/690
See application file for complete search history.

(56) References Cited

U.S. PATENT DOCUMENTS

| | | | |
|---|---|---|---|
| 5,974,254 A * | 10/1999 | Hsu ........................... 717/109 |
| 6,011,916 A | 1/2000 | Moore et al. |
| 6,282,698 B1 | 8/2001 | Barker et al. |
| 6,298,353 B1 | 10/2001 | Apte |
| 6,467,079 B1 | 10/2002 | Ettritch et al. |
| 6,480,860 B1 | 11/2002 | Monday |
| 6,526,571 B1 | 2/2003 | Aizikowitz et al. |
| 6,571,389 B1 | 5/2003 | Spyker et al. |
| 6,662,312 B1 * | 12/2003 | Keller et al. .................. 714/38 |
| 6,826,716 B2 * | 11/2004 | Mason ......................... 714/38 |
| 2001/0029604 A1 | 10/2001 | Dreybank et al. |
| 2002/0078115 A1 | 6/2002 | Poff et al. |
| 2002/0178191 A1 | 11/2002 | Sielken |

OTHER PUBLICATIONS

"Reflections on Java, Beans, and relational databases", Sandor Spruit, Published Sep. 1997, available online at http://www.javaworld.com/javaworld/jw-09-reflections.html.*

"Java Performance Tuning", Section 7.5, "Recursion and Stacks", Jack Sharazi, published Sep. 2000, available online at: http://proquest.safaribooksonline.com/0596000154.*

"java.lang Interface Comparable" from Java 2 Specification. Sun Microsystems. URL: http://java.sun.com/j2se/1.4.2/docs/api/java/lang/Comparable.html, 2003.*

(Continued)

*Primary Examiner*—Neveen Abel Jalil
*Assistant Examiner*—Mark A Radtke
(74) *Attorney, Agent, or Firm*—Lowenstein Sandler PC

(57) ABSTRACT

A utility for comparing two objects in an object-oriented operating system that also records the differences so that they may be put into human-readable form. In one exemplary embodiment of this invention, two JAVA objects are compared by calling one of the equality methods. If the selected equality method indicates that there is a difference between the two objects, then get . . . ( ) methods of each object are invoked in turn. The results get . . . ( ) methods are compared. If there are differences, the differences are stored in an XML document. The get . . . ( ) method is recursively invoked until the Class of the result has no more get . . . ( ) methods to decompose.

7 Claims, 13 Drawing Sheets

OTHER PUBLICATIONS

"JUnit Test Infected: Programmers Love Writing Tests", URL: http://junit.sourceforge.net/doc/testinfected/testing.htm, Feb. 20, 2001.*

"Display the Stack Trace" by Brett Spell for DevX. Mar. 24, 1999. URL: http://www.devx.com/tips/Tip/5570.*

"Testing Interface Compliance with Abstract Test" by Eric George. 2002. URL: http://www.placebosoft.com/abstract-test.html.*

"Difference-Based Modules: A Class-Independent Module Mechanism" Yuuji Ichisugi, Akira Tanaka. ECOOP 2002-Object-Oriented Programming: 16th European Conference Malaga, Spain, Jun. 10-14, 2002. Proceedings. URL: http://www.springerlink.com/content/9a3c8u8uccqagdka/.*

"Spying on Components: A Runtime Verification Technique" M. Barnett, W. Schulte. OOPSLA 2001, Workshop on Specification and Verification of Component-Based Systems, Oct. 2001. URL: http://research.microsoft.com/users/schulte/Papers/SpyingOnComponents(savcbs2001).pdf.*

* cited by examiner

FIG. 3

```
                                                   300 public class Address {
              private int m_age;
              private String m_firstName;
              private String m_lastName;
              private String m_title;
              private List m_address;
              public Address(int age, String firstName, String lastName, String title, List
address) {
                     m_age = age;
                     m_firstName = firstName;
                     m_lastName = lastName;
                     m_title = title;
                     m_address = address;
302            }
               public int getAge() {
                     return m_age;
304            }
               public String getFirstName() {
                     return m_firstName;
306            }
               public String getLastName() {
                     return m_lastName;
308            }
               public String getTitle() {
                     return m_title;
310            }
               public List getAddress() {
                     return m_address;
               }
       }
```

```
public void testAddressDiff() {
            List a1 = new ArrayList();
402 ⟶      a1.add("1 Underhole");
            a1.add("Cartoon Land");
            Address addr1 = new Address(13, "Bugs", "Bunny", "Mr", a1);

List a2 = new ArrayList();
404 ⟶      a2.add("2 Underhole");
            a2.add("Cartoon Land");
            Address addr2 = new Address(11, "Barb", "Bunny", "Ms", a2);

Document d = ObjectDiff.compare( addr1, addr2 );
            DocumentHelper.write(d, System.out);
        }
```

FIG. 5

```xml
<?xml version="1.0" encoding="UTF-8"?>
<objectDiff>
    <className>com.chase.gmdr.base.xml.test.ObjectDiffTest$Address</className>
    <fields>
        <field name="age" different="true">
            <objectDiff>
                <className>java.lang.Integer</className>
                <toString>
                    <left>13</left>
                    <right>11</right>
                </toString>
            </objectDiff>
        </field>
        <field name="firstName" different="true">
            <objectDiff>
                <className>java.lang.String</className>
                <toString>
                    <left>Bugs</left>
                    <right>Barb</right>
                </toString>
            </objectDiff>
        </field>
        <field name="lastName" different="false">
            <toString>Bunny</toString>
        </field>
        <field name="title" different="true">
            <objectDiff>
                <className>java.lang.String</className>
                <toString>
                    <left>Mr</left>
                    <right>Ms</right>
                </toString>
            </objectDiff>
        </field>
        <field name="address" different="true">
            <objectDiff>
                <className>java.util.ArrayList</className>
                <list>
                    <element index="0">
                        <objectDiff>
                            <className>java.lang.String</className>
                            <toString>
                                <left>1 Underhole</left>
                                <right>2 Underhole</right>
                            </toString>
                        </objectDiff>
                    </element>
                </list>
            </objectDiff>
        </field>
    </fields>
</objectDiff>
```

```
/***************************************************************
 objectDiff.java Copyright (2000) Chase Manhattan Corporation
 All rights reserved
 ***************************************************************/ package com.chase.gmdr.base.xml;

import java.util.*;
import java.lang.reflect.*;
import org.w3c.dom.*;
import com.chase.gmdr.base.service.logging.*;

/**
 * Utility methods for comparing two objects.
 *
 * Copyright (2000) Chase Manhattan Corporation All rights reserved
 *
 * @author John Phenix
 */
public class ObjectDiff
{
    /**
     * Interface to define a list of methods that should be ignored by the getMethods method
     * @see com.chase.gmdr.base.xml.ObjectDiff#getMethods
     */
    public interface MethodsToIgnore
    {
        public List getMethodsToIgnore();
    }

/**
     * Some static constants that specify the reason that two object differ using the compareObjects method.
     * @see com.chase.gmdr.base.xml.ObjectDiff#compareObjects
     */
    public interface CompareReasons
    {
        public final static int ONE_IS_NULL = 100;
        public final static int DIFFERENT_CLASSES = 101;
        public final static int DIFFERENT_LIST_SIZES = 102;
        public final static int UNABLE_TO_COMPARE = 103;
    }

/**
     * Creates a DOM Document descibing the differences between two objects.
     */
```

FIG. 7

```java
public final static Document compare( Object a, Object b )
{
    Document doc = null;
    try
    {
        doc = DocumentHelper.newDocument();
    }
    catch (java.io.IOException e)
    {
        FailureManager.log(ObjectDiff.class, "compare", "Unable to create new Document ", e);
        Errors.log(ObjectDiff.class, "compare", "Unable to create new Document", e);
    }

Node n = createObjectDiffNode(doc, a, b);
    if (n != null)
        doc.appendChild(n);
    else
        doc = null;

return doc;
}

/**
 * Compare two objects.
 * Can return a CompareReasons constant.
 * If the object is a list then compareLists is called.
 * If the object is a Comparable then compareTo is called, otherwise equals is called.
 * @return 0 if the objects are equal.
 */
public final static int compareObjects(Object a, Object b)
{
    if (a == null && b == null)
        return 0;
    if ((a == null && b != null) || (a != null && b == null))
        return CompareReasons.ONE_IS_NULL;
    if (!a.getClass().equals(b.getClass()))
        return CompareReasons.DIFFERENT_CLASSES;

if (a instanceof List)
        return compareLists((List)a, (List)b);
    else if (a instanceof Comparable )
        return ((Comparable )a).compareTo( b );
    else
        return a.equals(b) ? 0 : 1;
}
```

FIG. 8

```java
/**
 * Compares the results of the get methods (as returned from the getMethods method)
 * from the two objects.
 * Can return a CompareReasons constant.
 * @return 0 if the results from the get methods of the two objects are equal.
 */
public static int compareGetMethods(Object a, Object b)
{
    if (a == null && b == null)
        return 0;
    if ((a == null && b != null) || (a != null && b == null))
        return CompareReasons.ONE_IS_NULL;
    if (!a.getClass().equals(b.getClass()))
        return CompareReasons.DIFFERENT_CLASSES;

Method[] methods = getMethods(a);
    for (int i=0; i<methods.length; i++)
    {
        Object resa=null, resb=null;
        try
        {
            resa = methods[i].invoke( a, null );
            resb = methods[i].invoke( b, null );
        }
        catch ( Exception e )
        {
            FailureManager.log(ObjectDiff.class, "compareGetMethods", "unable to compare ", e);
            return CompareReasons.UNABLE_TO_COMPARE;
        } int result = compareObjects(resa, resb);
        if (result != 0)
            return result;
    }
    return 0;
}

/**
 * Compare two lists.
 * Can return a CompareReasons constant.
 * Calls compareObjects on each element of the list.
 * @return 0 if the objects are equal.
 */
public final static int compareLists(List a, List b)
{
```

FIG. 9

```
        if (a == null && b == null)
            return 0;
        if ((a == null && b != null) || (a != null && b == null))
            return CompareReasons.ONE_IS_NULL;
        if (a.size() != b.size())
            return CompareReasons.DIFFERENT_LIST_SIZES;
        if (a.size() == 0)
            return 0;
        int size = a.size();
        for (int i=0; i<size; i++)
        {
            Object oa = a.get(i);
            Object ob = b.get(i);

int c = compareObjects(oa, ob);
            if (c != 0)
                return c;
        }
        return 0;
    }
    private static Map s_methodMap = new HashMap();
    /**
     * Returns a list of methods for the specified object.
     * The methods must start with "get" and have no arguments.
     * The method getClass is not returned.
     * If the object implements GetMethodsToIgnore then these methods are ignored as well.
     * @return An array of Method
     */
    public final static Method[] getMethods(Object a)
    {
        Class c = a.getClass();
        /**
         * Cache the methods for each Class
         */
        if (s_methodMap.containsKey(c))
            return (Method[]) s_methodMap.get(c);

Method[] methods = c.getMethods();
        List newMethods = new ArrayList();

List methodsToIgnore = null;
        if (a instanceof MethodsToIgnore)
            methodsToIgnore = ((MethodsToIgnore)a).getMethodsToIgnore();

for( int i=0; i<methods.length; i++ )
        {
```

FIG. 10

```
            // if method begins with get and has no parameters
            String methodName = methods[i].getName();
            if( methodName.substring( 0, 3 ).equals("get")
            && methods[i].getParameterTypes().length == 0)
            {
                if(methodsToIgnore != null && (methodsToIgnore.contains(methodName)||!methodName.equals("
                    continue;
                if(methodName.equals("getClass")||methodName.equals("getThis"))
                    continue;
                newMethods.add(methods[i]);
            }
        }
        int size = newMethods.size();
        Method[] nMethods = new Method[size];
        for (int i=0; i<size; i++)
            nMethods[i] = (Method)newMethods.get(i);

s_methodMap.put(c, nMethods);
        return nMethods;
    }

/**
     * Create an objectDiff node that shows the difference between two objects.
     */
    private static Node createObjectDiffNode(Document doc, Object oa, Object ob )
    {
        // Compare oa and ob
        int c = compareObjects(oa, ob);
        switch (c)
        {
            case CompareReasons.DIFFERENT_CLASSES:
            {
                if (!(oa instanceof List))
                {
                    Node n = doc.createElement("differentClass");
                    n.appendChild(createValues(doc, oa.getClass().getName(), ob.getClass().getName()
                    return n;
                }
                break;
            }
            case CompareReasons.ONE_IS_NULL:
            {
                Node n = doc.createElement( "objectDiff" );
                n.appendChild( createElement(doc, "className", oa != null ? oa.getClass().getName():ob.g
                // Values
                n.appendChild(createValues(doc, oa, ob));
                return n;
```

FIG. 11

```
        }
        case 0:
            return null;
        }
        if (Trace.ON)
            Trace.log(ObjectDiff.class, "createObjectDiffNode", "DIFF class="+oa.getClass().getName());
        Node n = doc.createElement( "objectDiff" );
        n.appendChild( createElement(doc, "className", oa.getClass().getName() ) );

if (oa instanceof List)
            createListNode(doc, n, (List)oa, (List)ob);
        else if (oa.getClass() == String.class || oa instanceof java.util.Date || oa instanceof Number)
            n.appendChild(createValues(doc, oa,ob));
        else
            createFieldsNode(doc, n, oa, ob);

return n;
    }
    /**
     * Create list node.
     * Shows an element node for each element that is different in the two lists
     */
    private static void createListNode(Document doc, Node n, List oa, List ob)
    {
        // List
        Node list = doc.createElement("list");
        n.appendChild(list);

int size = oa.size();
        if (Trace.ON)
            Trace.log(ObjectDiff.class, "createObjectDiffNode", "List size="+size);
        if (size != ob.size())
        {
            Node reason = doc.createElement("listsAreDifferentSizes");
            reason.appendChild( createElement(doc, "left", Integer.toString(oa.size()) ) );
            reason.appendChild( createElement(doc, "right", Integer.toString(ob.size()) ) );
            list.appendChild(reason);
        }
        else
        {
            for (int i=0; i<size; i++)
            {
                // Now for each field create an objectDiff for each field
                Node elementDiff = createObjectDiffNode(doc, oa.get(i),ob.get(i));
```

FIG. 12

```java
                if (elementDiff != null)
                {
                    Node element = doc.createElement("element");
                    ((Element)element).setAttribute("index", Integer.toString(i));
                    element.appendChild(elementDiff);
                    list.appendChild(element);
                }
            }
        }
    }
}
/**
 * Creates a fields node, that lists each field that has a get method.
 * If the field is the same on both objects the value is simply output,
 * if the field is different an objectDiff node is created to show the differences.
 */
private static void createFieldsNode(Document doc, Node n, Object oa, Object ob)
{
    Node fields = doc.createElement("fields");
    n.appendChild(fields);

Method[] methods = getMethods(oa);
    for (int i=0; i<methods.length; i++)
    {
        String methodName = methods[i].getName();

Object resa=null, resb=null;
        try {
            resa = methods[i].invoke( oa, null );
            resb = methods[i].invoke( ob, null );
        }
        catch ( Exception e )
        {
            FailureManager.log(ObjectDiff.class, "createFieldsNode", "Unable to compare ", e);
        }
        boolean different = compareObjects(resa, resb) != 0;

Node field = doc.createElement("field");
        ((Element)field).setAttribute("name", fieldName(methodName));
        if (different)
        {
            ((Element)field).setAttribute("different", "true");
            field.appendChild(createObjectDiffNode(doc, resa, resb));
        }
        else
        {
```

FIG. 13

```java
            ((Element)field).setAttribute("different", "false");
            field.appendChild(createElement(doc, "toString", resa == null ? "null" : resa.toString()
        }
        fields.appendChild(field);
    }

/**
     * Creates element
     */
    private static Node createElement(Document doc, String type, String value )
    {
        Node n = doc.createElement( type );
        n.appendChild( doc.createTextNode( value ) );

return n;
    }

/**
     * Create a toString node
     */
    private static Node createValues(Document doc, Object oa, Object ob)
    {
        // values
        Node values = doc.createElement( "toString" );
        values.appendChild( createElement(doc, "left",  oa == null ? "null" : oa.toString() ) );
        values.appendChild( createElement(doc, "right", ob == null ? "null" : ob.toString() ) );
        return values;
    } private static Map s_fieldNames = new HashMap();
    /**
     * Change a method name to a field name; e.g. getFred to fred.
     * Cache in a HashMap because this will get called far many more times than there are method names.
     */
    private static String fieldName(String methodName)
    {
        if (s_fieldNames.containsKey(methodName))
            return (String) s_fieldNames.get(methodName);

StringBuffer sb = new StringBuffer(methodName);
        sb.delete(0,3);
        sb.setCharAt(0, Character.toLowerCase(sb.charAt(0)));
        String name = sb.toString();
        s_fieldNames.put(methodName, name);
        return name;
    }
```

UTILITY FOR IDENTIFYING DIFFERENCES BETWEEN TWO JAVA OBJECTS

CROSS-REFERENCE TO RELATED APPLICATION

This patent application is related to and claims the benefit of Provisional U.S. Patent Application No. 60/467,340 filed May 5, 2003, which application is hereby incorporated herein by reference in its entirety.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of object-oriented software, and, more specifically, to a utility for differentiating between two objects and, advantageously, storing the differences for display.

BACKGROUND OF THE INVENTION

Differentiating between two "things" of a similar nature is a problem frequently addressed in the area of computer science. In fact, many programmers take it for granted that a differentiation utility exists in their particular area. For example, the UNIX operating system includes a "diff" function that shows, line by line, the differences between two files. Microsoft Word includes a "Reviewing" taskbar that shows changes between and among versions of a document. In fact, many operating systems, word processors, operating environments include a procedure, function, facility, etc. that determines the differences between two items.

In more modern, object-oriented software areas, however, this differentiation utility is not always a part of the system. For example, JAVA, a programming language and operating system developed by Sun Microsystems, only provides a way of comparing the equality of two objects of the same Class. There is no universally defined method to determine the differences between two objects.

Therefore, a problem exists in the current object-oriented software art to differentiate between two objects of the same Class, especially in JAVA.

SUMMARY OF THE INVENTION

This problem is solved and a technical advance is achieved in the art by a system and method that provides a utility for comparing two objects in an object-oriented operating system and recording the differences so that they may be put into human-readable form.

Advantageously, the objects to be compared are JAVA objects and the differences are recorded in XML format, which is easily transformed into human-understandable form (e.g., transform the XML into web pages using XSL).

In one exemplary embodiment of this invention, two JAVA objects are compared by calling one of the JAVA equality methods. The equality method Comparable.compareTo( ) is used if the objects to compare are instances of Comparable. Otherwise, the Objects.equals( ) method is used. If the selected equality method indicates that there is a difference between the two objects, then the get . . . ( ) methods of each object are invoked in turn. The results of the get . . . ( ) methods are compared. If there are differences, the differences are stored in an XML document. The get . . . ( ) method is recursively invoked until the Class of the result indicates no further get . . . ( ) methods to decompose.

This exemplary embodiment of this invention generates an XML document that shows the difference(s) between the two objects. To show the context of a field that is different between the two objects, the full Class hierarchy is described with attributes showing which parts are different and which parts are the same. The value of each field is displayed by a toString( ) call when the type of the field cannot be decomposed by further get . . . ( ) calls.

BRIEF DESCRIPTION OF THE DRAWINGS

A more complete understanding of this invention may be obtained from a consideration of this specification taken in conjunction with the drawings, in which:

FIG. 3 is a sample Class definition for the purpose of illustrating operation of the exemplary embodiment of this invention;

FIG. 4 is a test case using the sample Class of FIG. 3;

FIG. 5 is the XML generated by the exemplary embodiment of this invention on the test case of FIG. 4; and FIGS. 6-13 comprise a program listing of an exemplary object differentiation program, called "objectDiff."

DETAILED DESCRIPTION

The Detailed Description section of this specification is divided into two parts. Part 1 comprises an overview of the exemplary embodiment of this invention. Part 2 comprises an example of the operation of the exemplary embodiment of this invention on a sample Class and sample data.

1. Overview of the Exemplary Embodiment of this Invention

In this illustrative embodiment of this invention, two JAVA objects are compared by calling one of the JAVA equality methods, "Comparable.compareTo( )" or "Objects.equals( )," which are known in the art. While the exemplary embodiment of this invention is described using JAVA, one skilled in the art will appreciate that this invention can be implemented in any object-oriented language that supports method introspection after studying this specification. According to the exemplary embodiment of this invention, the JAVA equality method "Comparable.compareTo( )" is called if the objects to compare are instances of Comparable. Otherwise, the "Objects.equals( )" method is called. If the selected equality method indicates that there is a difference between the two objects, then get . . . ( ) methods of each object are invoked in turn. As will be illustrated further, below, in a get . . . ( ) method, the ellipse represents the name of the method. The results of the get . . . ( ) methods are compared. If there are differences between the methods, the differences are stored in an XML document. Importantly, the get . . . ( ) method is recursively invoked until the Class of the result has no more get . . . ( ) methods to decompose.

This exemplary embodiment of this invention generates an XML document that records the difference(s) between the two objects. To show the context of a field that is different between the two objects, the full Class hierarchy is described in XML with attributes showing which parts are different and which parts are the same. Ultimately, the value of each field is displayed by a toString( ) call when the type of the field cannot be decomposed by further get . . . ( ) calls.

Figure 1:
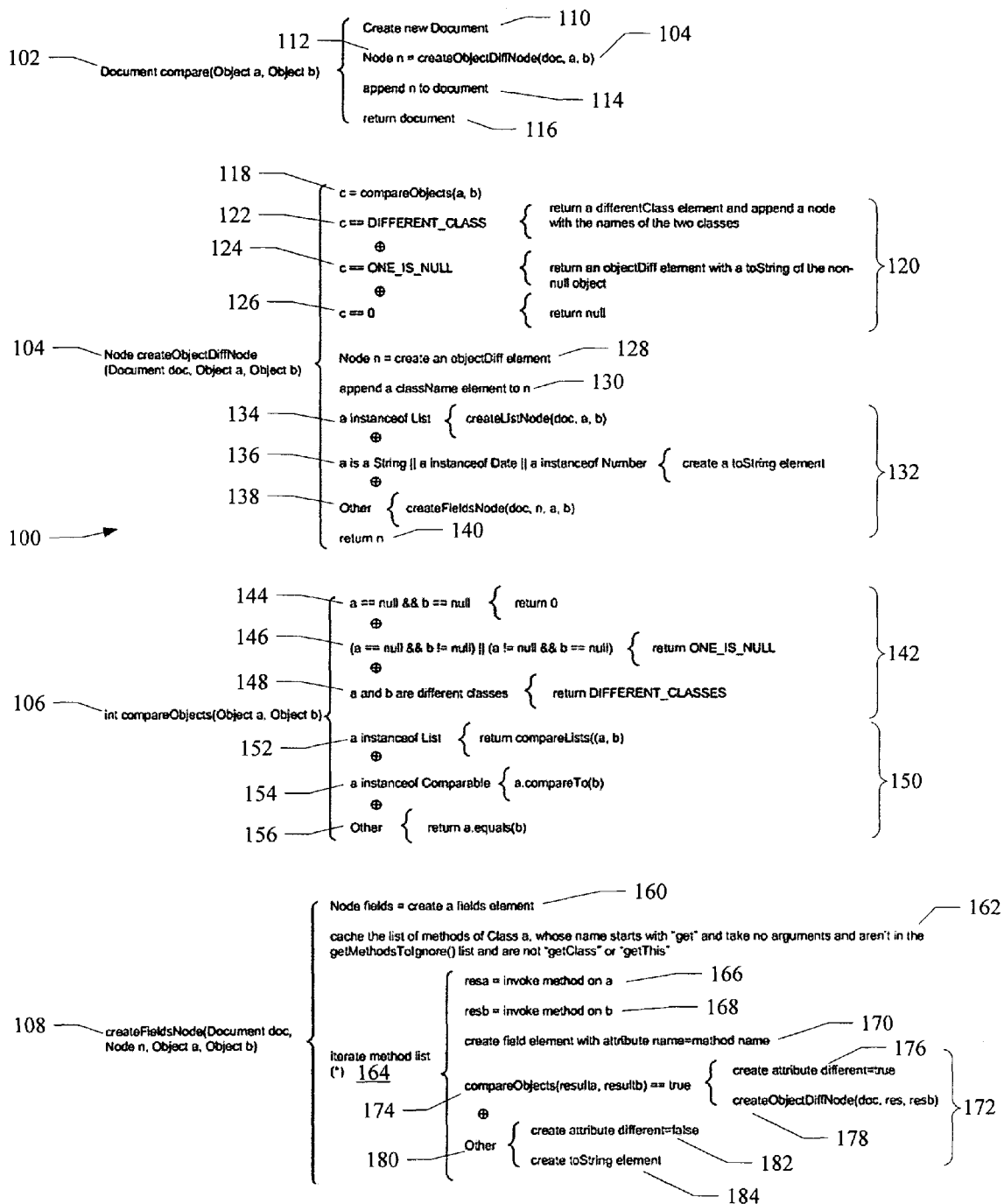
FIG. 1 is a Warnier/Orr diagram illustrating the organization of an exemplary embodiment of this invention.

FIG. 1 comprises a Warnier/Orr diagram 100 illustrating the organization of a process in accordance with an exemplary embodiment of this invention. In Warnier/Orr diagram 100, four functions are defined: compare 102, createObjectionDiffNode 104, compareObjects 106 and createFieldsNode 108. Each is described in turn.

Compare 102, takes two arguments, Object "a" and Object "b" (the two objects to be compared) and returns a document. Compare 102 first creates a new document 110. Document compare 102 then sets a node, "n," to the node returned by createObjectDiffNode 104 (described below). The node "n" is then appended to the document Mil 14 and the document is returned in 116.

The function createObjectDiffNode 104 takes three arguments: a "doc" of type Document, Object "a" and Object "b" and returns a node. At 118, CreateObjectDiffNode 104 sets a local variable "c" to the returned data from a function call to compareObjects 106 (described below). The value of "c" is checked for various conditions at bracket 120. If the objects are different classes, then, at 122, this function returns a different class element and appends a node with the names of the two classes. If one of the objects is null, then the function returns an objectDiff element with a toString of the non-null object in 124. If both objects are null, then "null" is returned from the function in 126.

The return node "n" is set to a created objectDiff element 128 and then Object "a's" class name element is appended to node "n" 130. In 132, if "a" is an instance of a list, then the function createListNode is called at 134, passing the arguments "doc," "a" and "b." If "a" is a string or an instance of a data or an instance of a number at 136, then a string element is created in 118. If "a" is anything else at 138, then the createFieldsNode 108 function is called. "n" is then returned at 140.

The function compareObjects 106 receives Object "a" and Object "b" as arguments and returns a type integer. This function first checks for exception cases in bracket 142. If, in 144, "a" and "b" are both null objects, then "0" is returned. In 146, if one of the two objects is null, then "ONE_IS_NULL" is returned. If Object "a" and Object "b" are different classes, then "DIFFERENT_CLASSES" is returned in 148.

In bracket 150, one of the JAVA equality methods is run on Object "a" and Object "b." In 152, if "a" is an instance of a list, then the results of a call to the compareLists function is returned. If "a" is an instance of an object of type "Comparable" in 154, then "a" is compared to "b". Otherwise, a equals (b) is returned in 156.

The function createFieldsNode 108 receives "doc" of type document, "n" of type node, Object "a" and Object "b" as arguments. First, this function sets the node fields to create a "fields" element in 160. Next, in 162, this function caches the list of methods of Class "a," whose name starts with "get" and takes no arguments and are not in the getMethodsToIgnore( ) list and are not "getClass" or "getThis."

CreateFieldsNode 108 then iterates the method list 164 by invoking the method on "a" in 166, then invoking the method on "b" in 168. In 170 a field element is created with the attribute name set to the method name. In bracket 172, compareObjects 106 is called on the results of the two method invocations 166 and 168 (above). If, in 174, the two method results are different, then an attribute is created in the document in 176 wherein the attribute is set to "true." In 178, the function createObjectDiffNode 104 is called. Herein is the recursion in this exemplary embodiment of this invention. These functions calls to createObjectDiffNode 104 repeat until compareObjects 106 returns a value other than "TRUE." When compareObjects 106 returns a value other than "TRUE" in 180, an attribute named "different" is set to "false" in 182 and a "toString" element is created in 184.

As stated above, an XML document is generated by the above functions that describe the differences between the two objects. The XML document type definition (DTD) is presented in table I.

TABLE I

```
<?xml version=' 1.0' encoding='UTF-8'?>
<!ELEMENT objectDiff(className, (fields I values I list))>
<!ELEMENT className (#PCDATA)>
<!ELEMENT fileds (field+)> <!ELEMENT filed (objectDiff)>
<!ATTLIST field name CDATA #REQUIRED>
<!ELEMENT list (element+ I reason)>
<!ELEMENT element (objectDiff)>
<!ATTLIST element index CDATA #REQUIRED>
<!ELEMENT values (left, right)>
<!ELEMENT left (#PCDATA)>
<!ELEMENT right (#PCDATA)>
<!ELEMENT reason (#PCDATA)>
```

Figure 2:
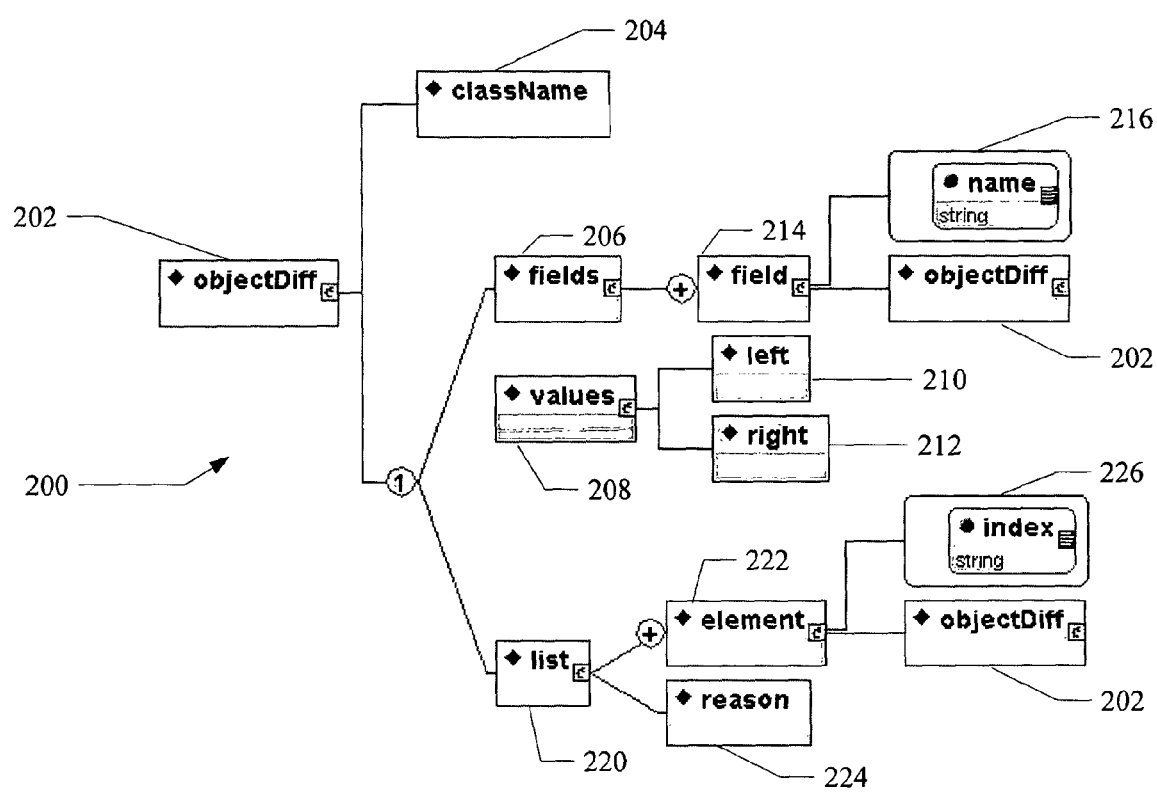
FIG. 2 is an element type diagram illustrating the XML document type declarations in accordance with the exemplary embodiment of this invention.

FIG. 2 is a relational diagram 200 of the elements of Table I. At the invocation of the differentiation function called herein "objectDiff" 202, the class name is listed 204. The fields are then listed 206. The values 208 of the fields are listed in "left" 210 and "right" 212 (corresponding to Object "a" and Object "b" above). For multiple fields 214, the name is entered 216 and "objectDiff" 202 is recursively described.

If a list 220 is developed, then the elements 222 are entered into the document along with a reason 224. An index 226 of the elements 222 is generated and "objectDiff" 202 is recursively called.

2. Example

The following three figures provide an example of the application of the above-described exemplary embodiment on sample objects of the same class. Turning first to FIG. 3, a public class named "Address" is shown as a sample class 300. This object includes five "get . . . ( )" methods: getAge( ) 302, getFirstName( ) 304, getLastName( ) 306, getTitle( ) 308 and getAddress( ) 310.

FIG. 4 illustrates two objects of the class Address 400. In this example, they are two simple addresses 402 and 404. FIG. 5 illustrates the XML document 500 that is generated by the exemplary embodiment of this invention. This XML document may be used by, for example, a browser, which displays the differences in human-readable form.

FIGS. 6-13 comprise a program listing for a sample "objectDiff" function.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A computer implemented method for comparing a first object and a second object in an object-oriented operating system comprising the steps of:
   (a) determining whether the first object is equal to the second object; and
   if said objects are not equal:
   (b) obtaining one or more methods from said first object and said second object;
   (c) determining whether the one or more methods from said first object are equal to the one or more methods from said second object; and
   (d) recursively performing steps (b) and (c) until all of the methods for the first object and the second object have been obtained;
   e) generating a document comprising a listing of differences between the methods;
   (f) transforming the document into a human-readable form; and
   (g) displaying the human-readable form to a user.

2. A method in accordance with claim 1 wherein step (b) further comprises storing names of said methods, step (c) comprises storing indicia representing the determination whether the methods are the same and step (e) comprises generating a document from said stored names and indicia.

3. A method in accordance with claim 1 wherein said object-oriented operating system comprises JAVA and step (a) comprises running an equality method on said objects.

4. A method in accordance with claim 1 wherein said object-oriented operating system comprises JAVA and step (c) comprises running an equality method on said objects.

5. A method in accordance with claim 1 wherein human-readable form comprises XML.

6. A method in accordance with claim 1 wherein transforming the document into human-readable form comprises transforming the document into a web page.

7. A method in accordance with claim 1 wherein said object-oriented operating system comprises JAVA and step (b) comprises invoking a get . . . ( ) method of each object.

* * * * *